Figure 1:
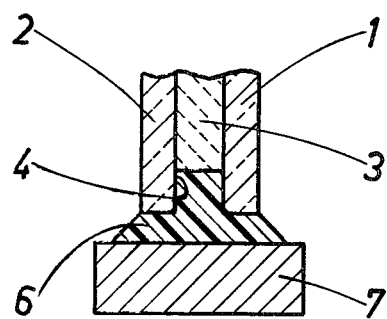

United States Patent [19]

Nolte et al.

[11] 4,104,427

[45] Aug. 1, 1978

[54] LAMINATED LIGHT-TRANSMITTING FIRE-SCREENING PANEL

[75] Inventors: Hans-Henning Nolte, Gelsenkirchen, Fed. Rep. of Germany; Marcel De Boel, Chatelineau; Pol Baudin, Fontaine-l'Eveque, both of Belgium

[73] Assignee: BFG Glassgroup, Paris, France

[21] Appl. No.: 713,181

[22] Filed: Aug. 10, 1976

[30] Foreign Application Priority Data

Aug. 22, 1975 [GB] United Kingdom .............. 34950/75

[51] Int. Cl.² .................. B32B 1/04; B32B 17/00
[52] U.S. Cl. ................................ 428/68; 52/171; 156/99; 428/189; 428/426; 428/428; 428/913; 428/920; 428/921
[58] Field of Search ............ 428/34, 920, 921, 68, 428/426–428, 913, 189; 156/99, 107, 109; 52/171

[56] References Cited

U.S. PATENT DOCUMENTS

| | | | |
|---|---|---|---|
| 2,708,774 | 5/1955 | Seelen | 428/34 |
| 3,640,837 | 2/1972 | Gaeth et al. | 428/428 |
| 3,783,084 | 1/1974 | Quenett | 428/34 |
| 3,919,023 | 11/1975 | Bowser et al. | 428/34 |
| 3,974,316 | 8/1976 | Jacquemin et al. | 428/920 |
| 3,997,700 | 12/1976 | Jacquemin et al. | 428/920 |

Primary Examiner—George F. Lesmes
Assistant Examiner—P. J. Thibodeau
Attorney, Agent, or Firm—Cushman, Darby & Cushman

[57] ABSTRACT

A laminated light-transmitting fire-screening panel comprising two outer plies and at least one layer of intumescent material sandwiched between the outer plies of the panel, the arrangement being such that the layer occupies an area which is less than the area of at least one of the outer plies so as to define therewith a recess leading along at least a portion of the edge of the panel.

9 Claims, 7 Drawing Figures

LAMINATED LIGHT-TRANSMITTING FIRE-SCREENING PANEL

This invention relates to a laminated light-transmitting fire-screening panel comprising one or more layers of intumescent material.

In the construction of buildings, light-transmitting panels have sometimes to be used in, e.g., interior walls to form partitions, and such partitions have occasionally to satisfy certain standards of fire resistance. For example, when a panel is exposed to a particular temperature cycle for a specified time, such standards may require that the panel should retain its strength without breaking, that it should be completely flame proof, that it should act as an infra-red radiation screening barrier and that the side thereof furthest from the source of heat should not become so hot as to involve serious risk of burning a person who touches it.

Clearly, an ordinary glass sheet will not satisfy these requirements for any significant length of time, and it has accordingly been proposed to use laminated panels in which a layer of intumescent material is sandwiched between two sheets of glass. Such panels have been made by depositing a layer of intumescent material onto a first glass sheet, drying such layer and bonding the layer to a second glass sheet by means of a layer of plastics materials, such as polyvinyl butyral. Although this has gone a long way towards meeting the standards referred to above for sufficiently long periods of exposure to fire, panels made in this way do suffer from certain disadvantages.

When such a fire-screening panel is held in a conventional frame channel, the lips of such channel will, of course, project over part of the panel faces, and accordingly, on the outbreak of fire, there will be a considerable thermal gradient across the shielded margin of the panel so that the panel is apt to break due to the attendant thermal shock. Two proposals have been made in attempts to reduce this thermal shock. In a first such proposal, the lips of the frame are lengthened to cover wider margins of the panel and thus reduce the thermal gradient. In the second proposal, one face of the panel is placed against a more or less conventional frame lip and the panel is held in place by a plurality of localized tongues bearing on its second face. This second proposal can work satisfactorily provided that fire breaks out on the side of the second face of the panel, since this allows substantially uniform heating thereof. Both of these proposals suffer from the disadvantage that they do not make allowance for increase of thickness of the panel on intumescence of the sandwiched material. In fact, the thickness of an intumescent layer can increase by as much as a factor of ten or possibly even more on exposure to fire. In a typical practical example, an intumescent layer 2.5mm thick can be sandwiched between two glass sheets each 4mm thick to make a panel 10.5mm thick before exposure to fire, but which might expand to 33mm thick after such exposure. Clearly, such an expansion would place a very severe strain on the frame and on the structural plies of the panel.

The present invention aims to reduce or even eliminate this disadvantage.

Accordingly, as broadly described, the present invention provides a laminated light-transmitting fire-screening panel comprising two outer plies and at least one layer of intumescent material sandwiched between the outer plies of the panel, the arrangement being such that the layer occupies an area which is less than the area of at least one of the outer plies so as to define herewith a recess or rebate leading along at least a portion of the edge of the panel.

A panel incorporating the recess can easily be mounted in a frame comprising one or more members leading around the panel and provided with elements for engagement with the recess. In this way, provision can be made for the free relative movement of the outer plies of the panel on intumescence of the sandwiched material, and such a frame can also permit uniform heating of the whole extent of the panel on exposure to fire no matter on which side the fire breaks out.

Preferably, the panel is mounted in a frame member which engages with the recess to hold the panel so that its outer plies are free to move apart on intumescence of the layer between them.

Alternatively, such recess can be used to assist in locating a panel edge protecting member which serves to protect the edges of the panel from damage at least during transport. Such an edge protecting member can be given any suitable shape, for example, so that it can be accommodated in a conventional frame channel component in which case it may be permanently attached to the panel and constitute a portion of a frame.

In some embodiments of the invention, the edge recess is formed by applying intumescent material to cover substantially the whole area of a first outer ply and bonding that ply to a second outer ply with the intumescent material between them, which second ply is of greater area than the first, so that the recess is at least, in part, defined by the edges of the first ply and the intumescent material and a projecting lip formed by marginal portions of the second ply. In such embodiments, the second outer ply is preferably clamped in a conventional channel frame component.

In the most preferred embodiments of the invention, however, the recess is constituted as a groove formed in the thickness of the intumescent material. In such embodiments, it is preferable that the frame comprises a tongue which engages in the groove.

Alternatively, or in addition, such a recess can be, and preferably is, used to accommodate sealing means protecting the intumescent material against contact with the atmosphere. A tongue is preferably glued inside the groove, and this can be arranged to seal the intumescent material from the atmosphere without any supplementary sealing means. Adhesives based on neoprene, polyurethane or polysulphide are suitable. Preferably, the sealing means is formed of a material so that it will flow under the influence of heat due to the advent of a fire thereby to maintain sealing of the panel to its frame on intumescence of the sandwiched material. Advantageously, the tongue is formed of a material so that it will expand under the influence of heat due to the advent of a fire thereby to maintain sealing of the panel to its frame on intumescence of the sandwiched material.

The frame should itself be of fire-resistant material. For example, the frame could be of ceramic, noninflammable plastics material, concrete, metal or wood which has been treated to make it fire proof. It is especially suitable to make a frame member from an intumescent material, for example, hydrated sodium silicate. Such intumescent material should be coated so as to protect it from the atmosphere, if this is desirable, and the frame member may incorporate some form of reinforcement, for example, fibers, such as glass fibers or a network of metallic threads, held in a matrix of the intumescent material. One such material is sold by Badische Anilin- & Soda-Fabrik A.G. under their Trade Mark Palusol, and comprises a body of hydrated sodium silicate having a coating of epoxy resin.

Embodiments of the invention wherein the frame comprises an intumescent material as aforesaid have the advantage that the frame can expand with expansion of the panel on exposure to fire, thus maintaining support for the panel.

The groove in the thickness of the intumescent material can be formed in several different ways. For example, such material could be initially applied to an outer ply in such a way as to leave marginal zones thereof uncovered. Alternatively, such a groove could be formed by dissolving away marginal portions of such material which had initially extended over the full area of the panel. Or a groove could be mechanically cut around at least a part of the periphery of the panel, thus removing at least part of the thickness of the sandwiched intumescent material at marginal zones of the panel.

Advantageously, at least one, and preferably both, said outer plies are vitreous sheets. The word "vitreous" is used herein to denote articles made from glass or vitro-crystalline material. Vitro-crystalline materials can be made by subjecting glass to a heat treatment so as to induce the formation of one or more crystalline phases therein.

Advantageously, the intumescent material comprises a hydrated metal salt. Examples of metal salts which can be used in hydrated form are as follows:

Aluminates, e.g., sodium or potassium aluminate
Plumbates, e.g., sodium or potassium plumbate
Stannates, e.g., sodium or potassium stannate
Alums, e.g., sodium aluminum sulphate or potassium aluminum sulphate
Borates, e.g., sodium borate
Phosphates, e.g., sodium orthophosphates, potassium orthophosphates and aluminum phosphate Hydrated alkali metal silicates, e.g., sodium silicate, are especially suitable for use in the layer of intumescent material. Such substances have very good properties for the purpose in view. They are, in many cases, capable of forming transparent layers which adhere well to glass or vitro-crystalline material. On being sufficiently heated, the combined water boils and the layers foam so that the hydrated metal salt is converted into an opaque solid porous mass of cellular form in which it is highly thermally insulating and remains adherent to the glass or vitro-crystalline material.

This feature is particularly important since even if all the structural plies of the panel are cracked or broken by thermal shock, the panel may retain its effectiveness as a barrier against heat and fumes since the fragments of the plies may remain in position bonded together by the converted metal salt.

In some embodiments, a layer of hydrated metal salt is used which is merely translucent, but preferably the hydrated metal salt forms a transparent solid layer at ambient temperature. Sodium silicate, sodium aluminum sulphate and aluminum phosphate can form transparent layers. Preferably, the total amount of intumescent material applied is such as to form a layer in the finished panel of between 0.1mm and 8mm thick, preferably between 0.1mm and 3mm thick; such layer may, for example, be between 0.8mm and 1.0mm thick. Such layer thicknesses are found to be a good compromise between cost, light transmission before exposure to fire and fire resistance.

The or each vitreous ply for assembly into the panel may be tempered, e.g., chemically tempered.

It has been found that vitreous sheets may suffer deterioration to varying degree by prolonged contact with various intumescent materials, e.g., hydrated metal salts. This is particularly important in the case of transparent or colored sheets since they may suffer a loss of transparency or undergo a change in color. Advantageously, therefore, a protective stratum is formed on at least one, and preferably each, vitreous ply face before the intumescent material is applied to such face, and the protective stratum is composed of a substance selected so as to inhibit interaction between the intumescent material and such ply face.

In some preferred embodiments, the protective stratum comprises a sheet of substantially water-impervious plastics material. Polyvinyl butyral is an especially suitable material for forming a plastics protective stratum, which may, for example, be 0.76mm thick, though any other film-forming plastics material having the requisite properties may be used. In some embodiments of the invention, the plastics protective stratum comprises a plastics material which has been polymerized in situ, such as polyurethane.

In other preferred embodiments of the invention, there is at least one such protective stratum which comprises a coating applied to the vitreous sheet face to be protected. Such a protective coating preferably comprises an anhydrous metal compound deposited onto one or more ply faces since such coatings can form very effective protective strata. Preferably, the anhydrous metal compound is deposited by hydrolysis since this is convenient in practice. Another very convenient way of depositing the anhydrous metal compound is by pyrolysis. Preferably, the protective coating is between 100 and 1,000 Angstrom units thick so as to provide a non-porous coating without giving rise to unsightly intereference effects.

Clearly, one criterion affecting choice of a suitable coating material will be the composition of the intumescent material. By way of example, when the intumescent material comprises a hydrated metal salt selected from sodium aluminum sulphate, aluminum phosphate and alkali metal silicates, the anhydrous metal compound is preferably selected from zirconium oxide and anhydrous aluminum phosphate. It is perhaps surprising to note that a protective coating of anhydrous aluminum phosphate, when deposited onto a vitreous sheet, will serve substantially to prevent interaction between that vitreous sheet and an adjacent layer of hydrated aluminum phosphate.

This invention does not exclude the use of other materials. For example, when the intumescent material comprises hydrated aluminum phosphate, titanium oxide and tin oxide are also eminently suitable coating materials. Alternatively, or in addition, a coating having other properties may be applied to a vitreous sheet of the panel. For example, an infra-red reflecting coating of a noble metal, copper, aluminum or an oxide may be applied and this will have the advantage of affording some protection for the intumescent material against the absorption of infra-red radiation which could cause the intumescent material to become opaque and blister even before the advent of fire. Furthermore, the use of such an infra-red reflecting coating can increase the time taken for the layer to intumesce on the outbreak of fire, and this will in turn increase the time for which protection is given.

Another way of giving longer protection is to make the panel using two layers of intumescent material which are separated by a fluid impervious membrane. When such a panel is exposed to fire, the intumescent layer nearer the fire will intumesce, but the other layer will not be converted by the heat until intumescence of the first layer is substantially complete. The membrane may be made from polyvinyl butyral, which bonds the layers together. It will be appreciated that a polyvinyl butyral membrane can also be used to bond a single layer to a vitreous sheet.

Preferably, the groove is at least 2mm deep. The adoption of this feature allows an improvement in keying between the panel and the frame. The groove may be between 4mm and 10mm deep, for example, it may be approximately 6mm deep.

It is possible for a said recess to be formed in distinct panel edge portions, but it is preferably continuous around the panel.

Figure 2:
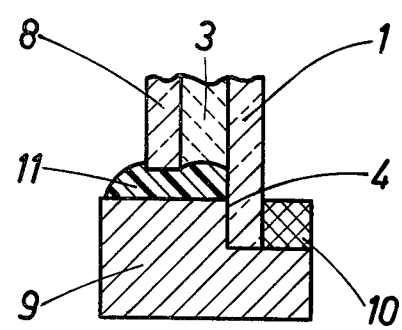
Figure 3:
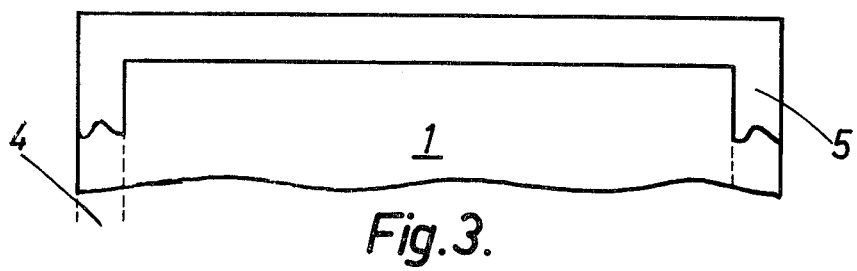

The invention will now be described by way of example with reference to the accompanying diagrammatic drawings, in which: FIGS. 1 and 2 are cross-sectional views of two embodiments of fire-screening panel according to the invention; FIG. 3 is a detail view of a mask applied to a sheet prior to the application of intumescent material; and FIGS. 4-7 are detail edge elevations of fire-screening panels.

EXAMPLE 1

A fire-screening panel was made as shown in FIGS. 1 and 3. This panel comprises two sheets of glass 1, 2, each 3mm thick, to the first of which a layer 3 of intumescent material 2.5mm thick has been applied.

In order to form the layer 3, hydrated sodium aluminum sulphate was applied in an aqueous solution.

This solution was applied to a face of the first glass sheet while it was substantially horizontal and at a temperature of 20° C. The solution was allowed to spread out over the sheet and was dried by directing a current of warm air across the sheet using a fan. When the layer had become dry, it was bonded to the second glass sheet 2.

Figure 5:
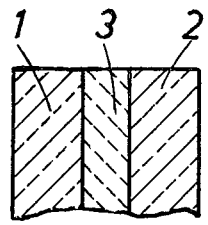
Figure 6:
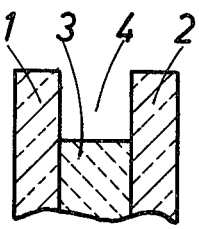

In order that this panel should conform with the invention, a groove 4 was provided leading around the periphery of the panel. This was done by placing a mask 5 (FIG. 3) over the first sheet 1 prior to the application of the intumescent material. The mask occupied the marginal zone of the sheet which would define the depth of the groove 4 in the finished panel. In a variant method of manufacture, intumescent material is applied to the whole of the first sheet 1 to give an edge profile as shown in FIG. 5, and a groove is cut in the edge thereof by removing the hydrated sodium aluminum sulphate over a marginal zone to define a groove 4 leading around the panel, as is illustrated in FIG. 6.

Figure 7:
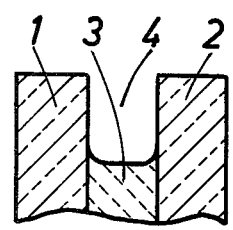

In a variant of this Example, the layer of hydrated sodium aluminum sulphate was applied over the whole area of the first sheet and dried as before and the thus coated sheet was then immersed in a bath of water. The second sheet 2 was then slid into registry and the thus assembled panel was left in the bath for a sufficient time for the marginal zone of the sandwiched layer to have been dissolved away to leave a recess in the form of a groove 4 as shown in FIG. 7.

In a further variant, the face of each of the sheets of glass which was to be interior of the panel was protected from direct contact with the intumescent material by applying thereto a protective coating of anhydrous aluminum phosphate 500 Angstrom units thick.

Such a coating can be formed as follows. A solution in alcohol containing one mole of anhydrous aluminum trichloride and one mole of anhydrous phosphoric acid is prepared. This can be applied to the upper faces of horizontally laid sheets of glass and allowed to spread out to form a uniform covering. The sheets are dried and placed in a furnace heated to 400° C. This gives a strongly adherent coating of anhydrous aluminum phosphate.

As will be noted from FIG. 1, the groove 4 along the edge of the panel is filled with a body of sealing material 6 which also serves to seal the panel into a frame, part of which is shown at 7. The sealing material 6 may be a neoprene-based adhesive.

On the outbreak of fire on one side of the panel illustrated in FIG. 1, the sandwiched layer will intumesce, and the sealing material 6 will become softened. Due to the build up of pressure between the glass sheets, they will move apart, and also, the intrumescing material in the layer 3 will be forced out around the edges of the panel displacing the sealing material 6 in the groove 4 to form a tumid barrier extending right up to the frame 7.

In a variant of this embodiment, the frame member 7 is provided with a tongue which is glued into the groove 4 to locate the panel.

EXAMPLE 2

A fire-screening panel was made as shown in FIGS. 2 and 3. A glass sheet 1 was coated with an intumescent layer 3 of hydrated aluminum phosphate 5mm thick. The sheet was laid horizontally and a masking frame 5 was laid to occupy marginal zones of the sheet (FIG. 3) which define the rebate 4 (FIG. 2). An aqueous solution of 3.5 moles of hydrated aluminum phosphate was obtained by mixing hydrated aluminum chloride ($AlCl_3 \cdot 6H_2O$) and phosphoric acid ($H_3PO_4$), and this was then poured onto the horizontal sheets and dried by ventilation with warm air.

A second sheet 8 was then assembled and bonded to the layer 3 deposited on the first sheet 1. As will be noted from FIG. 2, this sheet 8 was of substantially the same area of the layer 3 so that there is no groove, but rather a recess or rebate 4 leading around the edge of the panel. This embodiment has the advantage of enabling the first glass sheet 1 to be fixed into a conventional type of frame comprising an L-section member 9 and a retaining strip 10. The second sheet 8 is sealed to the L-section frame member 9 using a body 11 of heat-flowable sealing material.

When a panel, according to this embodiment, is exposed to fire, the first glass sheet 1 will remain fixed in the frame 9, 10, but because of the shape of the frame, the second glass sheet 8 is free to move away from the first sheet on intumescence of the sandwiched material.

In order to reduce the effects of thermal shock at the edge of the first sheet 1 should fire break out on that side of the panel, the retaining strip 10 may be made of a conductive material, for example, a metal, such as aluminum. Alternatively, the strip may be replaced by a series of short, spaced retaining members. It is not necessary to take such precautions to guard against thermal shock due to outbreak of fire on the other side of the panel since the insulation afforded the edges of the first sheet 1 by the L-section member 9 will be largely balanced by the insulation afforded by the second sheet 8 and the sandwiched layer.

In a variant of this Example, one face of each sheet was given a 400 Angstrom unit protective coating of tin oxide by the well-known hydrolysis process.

EXAMPLE 3

A fire-screening panel, according to the invention, was made in accordance with FIGS. 3 and 6. In FIG. 6, two glass sheets 1, 2 were each 4mm thick and provided with a stratum of hydrated sodium silicate 2.5mm thick, and these strata were bonded together to form a 5mm layer 3. In order to form the layer 3, hydrated sodium silicate was applied to each sheet in an aqueous solution having the following properties:

Proportion by weight $SiO_2:Na_2O = 3.4:1$
Viscosity = 0.2 poise
Specific Gravity 37°–40° Baume This solution was applied to a face of each horizontally laid sheet at a temperature of 20° C, and was allowed to spread out over the sheets. Each layer was then dried by ventilation with air at 35° C and 50% relative humidity. This drying has the effect of driving off excess, unbound water of solution to leave a layer of hydrated sodium silicate on each glass sheet. After formation of these layers of hydrated sodium silicate on the sheets, the sheets were bonded together so as to leave a groove 4 extending round the assembled panel.

The panel thus formed may be placed in a frame very easily and is further very advantageous in the case of a fire. It should be noted that on the advent of fire, the layer 3 of hydrated sodium silicate intumesces and is converted to an anhydrous mass having an opaque porous form.

The panel has a high degree of mechanical stability during and after intumescence of its sandwiched layer.

In a variant embodiment shown in FIG. 6, use was made of glass sheets 1 and 2 which had been subjected to a chemical tempering treatment involving diffusion of ions into the glass from a contacting medium. This chemical tempering was an exchange of sodium ions from surface layers of the treated sheets by potassium ions from the contacting medium which comprises a bath of molten potassium nitrate maintained at a temperature of 470° C. The result obtained from the point of view of thermal insulation, mechanical stability and effectiveness as a flame- and fume-proof barrier were analogous to those obtained with the fire-screening panel above described. However, this variant has a greater resistance to thermal shock during the first few minutes of a fire than does the panel described above.

In a second variant for use in situations where there is only a very slight fire risk on one side of the partition, the sheet of glass 1 to be directed towards that side is replaced by a sheet of plastics material. Again, the results obtained from the point of view of resistance to fire were similar to those above.

In a third variant, a fire-screening panel was constructed exactly as described at the beginning of this example, except that the strata of hydrated sodium silicate were formed to a thickness of 0.2mm instead of 2.5mm. From the point of view of fire resistance, this variant panel is slightly less effective than the panels described above. However, this panel does have the advantage of increased transparency.

In yet a further variant embodiment, a stream of water is directed against the edges of the laminate further to dissolve away the layers of intumescent material over marginal zones of the panel. A sealing compound, e.g., a neoprene-based adhesive, can be introduced into the enlarged groove to protect the intumescent material from deterioration as a result of contact with the atmosphere, and this adhesive can also serve to hold a framing component in the groove.

EXAMPLE 4

Figure 4:
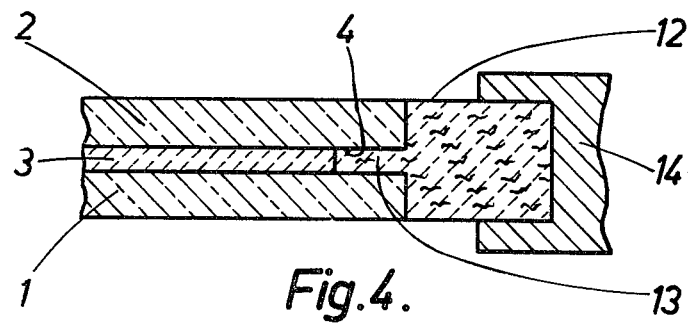

FIG. 4 shows a detail of a panel, according to the invention, comprising two vitreous sheets 1, 2 with a layer 3 of intumescent material sandwiched between them. A framing component generally indicated at 12 has a tongue 13 which is glued inside a groove 4 formed between the two vitreous sheets.

This gluing also serves to seal the intumescent layer in the completed panel from the atmosphere.

In a particular practical example, the framing component was made by laminating together strips of Palusol (Trade Mark of Badische Anilin- and Soda-Fabrik A.G.) which, as has been stated, is available as a composite material comprising glass fibers or a network of metallic threads embedded in a matrix of hydrated sodium silicate and coated with epoxy resin. This material is available in sheets 1.8mm thick. It is accordingly convenient to make the intumescent material 2mm thick if the tongue 13 is to consist of a single strip. The framing component 12 may be held in a conventional channel frame 14. The fact that on the outbreak of fire, the framing component will intumesce and accordingly expand is an important advantage, especially if it is not confined over the whole of its surface, in that as the intumescent layer 3 expands, so will the tongue 13, and bonding of the frame component to both glass sheets can be maintained.

The intumescent layer 3 was formed by depositing on each of the vitreous sheets 1, 2 a stratum 1mm thick of hydrated sodium silicate; this was done in the same way as was described in Example 3.

After drying these strata of intumescent material, the first sheet was laid in a bath of sodium hydroxide solution and the second sheet was slid across the first to bring the strata into contacting registry. The assembly was left in the bath for several hours until marginal zones of the hydrated sodium silicate had been dissolved away to leave a groove 4 about 6mm deep as shown in FIG. 4.

In a variant of this Example, the tongued framing component can be made of metal, for example, aluminum alloy. In such a case, the framing component which can be formed by extrusion may be given a shape which will allow it to be fixed directly, e.g., by screws, into a window space; the channel member 14 can then be dispensed with.

What is claimed is:

1. A laminated light-transmitting fire-screening panel comprising two outer nitreous plies, each having an inner face and at least one layer of intumescent material bonded to each said inner face over an area which is less than the total surface area of at least one of said inner faces of one of said outer plies to define therewith at least one recess leading along at least a portion of the edge of said panel, frame means having a portion inserted in said recess for holding said panel so that upon swelling of said layer, at least one of said plies is free to move away from the other ply, said frame means also including sealing means in said recess for protecting the intumescent material against contact with the atmosphere.

2. A panel as defined in claim 1 including edge protecting member engaging said recess.

3. A panel as defined in claim 1 wherein said recess is constituted as a groove formed by marginal edge portions of both outer plies.

4. A panel as defined in claim 3 wherein said panel includes holding means engaging said groove for holding said panel so that its outer plies are free to move apart on intumescence of said layer between them and said holding means includes a frame and a tongue which engages in said groove.

5. A panel as defined in claim 4 wherein said tongue is formed of a material operable to expand under the influence of heat due to the advent of a fire thereby to maintain sealing of the panel of the said frame on intumescence of the sandwiched material.

6. A panel as defined in claim 1 wherein said sealing means is formed of a material operable to flow under the influence of heat due to the advent of a fire.

7. A panel as defined in claim 1 wherein said intumescent material comprises a hydrated metal salt.

8. A panel as defined in claim 7 wherein the hydrated metal salt forms a transparent solid layer at ambient temperature.

9. A panel as defined in claim 7 wherein said hydrated metal salt is hydrated sodium silicate.

* * * * *